Sept. 3, 1957   M. F. JEFFERS ET AL   2,804,986
PANEL BOX
Filed Feb. 24, 1956

INVENTORS.
Frank J. Ragone
Michael F. Jeffers
BY
ATTORNEY

United States Patent Office 2,804,986
Patented Sept. 3, 1957

2,804,986

PANEL BOX

Michael F. Jeffers, Flourtown, Pa., and Frank J. Ragone, Pennsauken, N. J., assignors to Jerrold Electronics Corporation, Philadelphia, Pa., a corporation of Delaware Application February 24, 1956, Serial No. 567,531

5 Claims. (Cl. 220—38)

This invention relates to panel boxes for electrical equipment, in particular for use out of doors, and has as its principal object the provision of a simple economical panel box which is easy to install, the front of which can be completely opened up for ready access without separating the front cover from the box, and yet without running the risk of shorts from possible contact with the cover, and which at the same time completely protects the contents of the box from the weather.

Electrical panel boxes for outside use must first of all be weathertight. They generally consist, therefore, of metal boxes completely closed all around except for the front of the box.

The top of the box, in order to insure weather proofness, should extend over the sides, and generally has depending shoulders, particularly in front to prevent wind driven rain from entering at the joint between the front of the box and the top.

The problem in making such a box truly weather resistant lies in the connection between the box and its front. Since the front must be opened to get at the equipment, it must be connected to the box in some way. Simple hinges and bolt holes which go through the box leak; more elaborate devices make the opening and closing of the box a time consuming operation. If the cover is completely removed during a repair, care must be taken not to misplace the cover and the associated fastening; if the cover is not removed, there is the danger that a sudden wind, or jolt, will move the cover and cause a possible short circuit.

According to our invention, we provide a weather proof electrical panel box comprising an ordinary box with an overhanging top and an open front, with flanges extending a short distance into the open front on its side and bottom; we provide a front cover with flanges on all sides overlaying the sides and bottom of the box, and extending into the box at the top, the top flange being partially cut away at the ends so that it can be inserted into the opening, when the cover is at an angle, and then can act as a hinge when the cover is straightened out. A tongue of flexible metal, secured to the bottom of the box and spaced from it at the front a distance approximating the thickness of the bottom flange of the front cover, holds the cover in place. The tongue preferably has a downward projecting end portion with a pair of holes drilled therein, matching a lug on the front of the box with corresponding holes, so that a padlock can be inserted in one pair of holes to lock the box and a seal if desired in the other pair.

The invention can best be understood by reference to the accompanying drawings, in which Fig. 1 is a perspective view of our box, with the front cover partially down;

Figure 1:
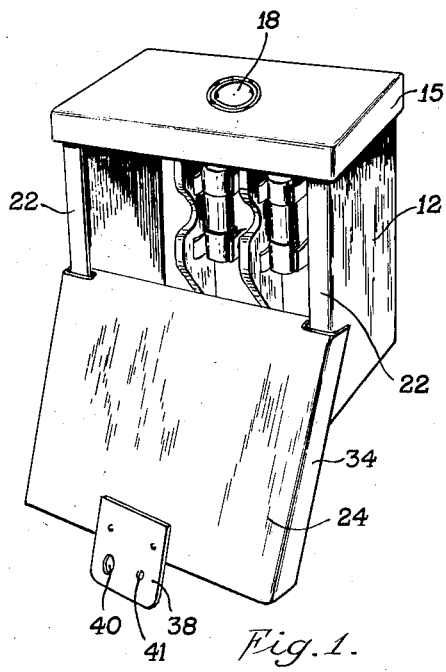
Figure 3:
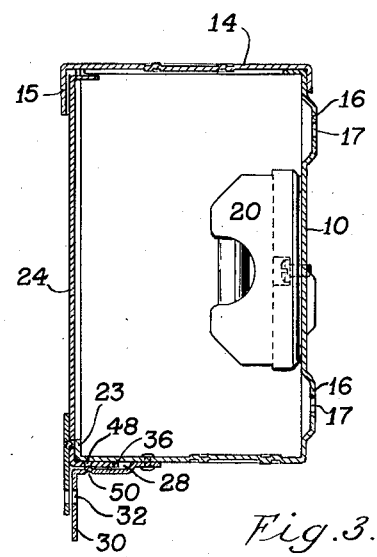
Fig. 3 is a vertical section through the center of the box, with the front cover in closed position.
Figure 2:
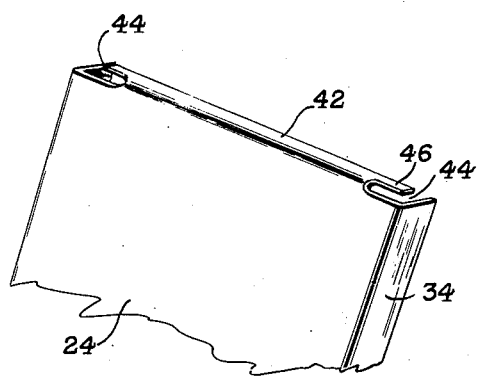
Fig. 2 is a fragmentary perspective showing the construction of top of the front cover.
Figure 4:
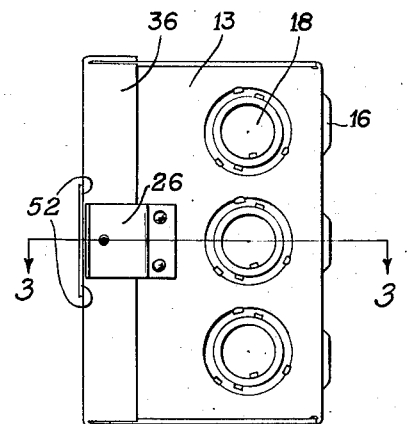
Fig. 4 is a bottom view of the box.

Referring to the drawings, our box comprises the conventional unitary structure consisting of a back 10, sides 11 and 12, bottom 13 and a top 14 with a set of overhangs 15 covering the entire structure. Knobs 16, in which screw holes 17 are bored, are provided on the back of the box so that it can be mounted on a pole or wall. Knockouts 18 for electrical conduits are provided, preferably in the bottom and top of the box, for connection with the electrical equipment 20 in the box. At the front of the box, the sides end in flanges 22, and the bottom in a flange 23, which cooperate with the cover 24 as will hereinafter be disclosed.

A tongue 26 is fixed, as by rivets, to the bottom of the box near its front center portion. It is first offset to provide a slot 28 of a width approximately the thickness of the cover, and is then bent down vertically in the plane of the cover to provide a projection 30, which has a large hole 32 and a smaller hole (not visible on the drawings), drilled therein.

The cover 24 has side flanges 34 which overlay the sides, a bottom flange 36 which fits into the slot 28, and a dependent lug 38 with a hole 40 drilled therein which matches the hole 32 in the projection 30, and a second smaller hole 41 to match the corresponding small hole (not shown) in the projection 30.

A top flange 42 on the cover is cut away at each end to provide an L-shaped opening 44. The base of each L along the flange 34 is as long as the flange 34, and thick enough to give some clearance between the end of the top flange 42 and the sides 11 and 12 of the box, but of less thickness than the width of the flange 22. The vertical stroke on each L is somewhat wider than the thickness of the metal of the box. By virtue of this construction, the projections 46 formed by cutting away the metal act as hinges when the cover is mounted on the box. The cover may be mounted and dismounted simply by tilting the lid to a position parallel to the top of the box, and then turning it about the plane of the front until it is free of the shoulders 22; it may be remounted by reversing the procedure. The cover is then pushed upward until it hits the top, and the flange 36 rests in the outside of the groove 28.

To secure the device in closed position, we prefer to drill a small hole 48 in the flange 36, to match a punched projection 50 in the tongue 26. As soon as the edge of the flange 36 hits the projection 50, it is stopped until pressure is applied; when the hole 48 hits the projection, the device is secured in closed position. Obviously, a hasp lock can be inserted in the holes 32—40 to lock the device, and/or a seal through the hole 41 and the corresponding hole in the projection 30.

When the box is to be opened without removing the cover, the flange 36 is pulled out by grasping the lug 38 at its end; it is made wider than the projection 30 to provide pivot surfaces 52 for the fingers of the operator. As it pulls out, it pivots about the projections 46 until the flange 36 clears the projection 30; it then slides down by gravity, and ends up with the flange 42 resting on the bottom flange 23, and the projections 46 behind the side flanges 22 holding the cover in place. It should be noted that accidental jostling of the cover, or unexpected winds, would not bring the cover up into the opening. Additionally, the cover is readily removable, and attaches by itself.

Obviously, the specific embodiment of the invention described herein can be modified without departing from the scope of our invention as defined in the claims.

We claim:

1. A weatherproof box having an open front, and otherwise closed by a bottom, back sides, and top, the top having a flange depending from it over the open front, side flanges extending from the sides of the box into the open front under the top flange, a front cover fitting the front of the box having side and bottom flanges overlaying the sides and bottom of the box and a top flange extending inwardly into the box and cut away at its ends to provide L shaped openings to fit about the side flanges of the box, and means to hold the cover in closed position.

2. A weatherproof box having an open front, and otherwise closed by a bottom, back sides, and top, the top having a flange depending from it over the open front, side flanges extending from the sides of the box into the open front under the top flange, a front cover fitting the front of the box having side and bottom flanges overlaying the sides and bottom of the box and a top flange extending inwardly into the box and cut away at its ends to provide L shaped openings to fit about the side flanges of the box, and means mounted on the bottom of the box cooperating with the bottom flange of the front cover to hold the cover in closed position.

3. A weatherproof panel box for electrical equipment comprising a box having a bottom, a top, a back and sides, whereby it is protected on all sides from the weather except for an open front, a flange depending from the top of the box overlaying the front, side flanges extending from the sides of the box into the open front under the top flange, a cover fitting the front of the box having side and bottom flanges overlaying the sides and bottom of the box, and a top flange extending inwardly into the box, said top flange being cut away at its ends to provide L shaped openings, to fit the side flanges of the box, and of such dimensions that the cover can be mounted and demounted by tilting the cover in the plane of the box front to a point where the projection formed by one of the L shaped openings clears the corresponding side flange of the box front so the cover may be removed or inserted, and means to hold the cover in closed position.

4. A weatherproof panel box for electrical equipment comprising a box having a bottom, a top, a back and sides, whereby it is protected on all sides from the weather except for an open front, a flange depending from the top of the box overlaying the front, side flanges extending from the sides of the box into the open front under the top flange, a cover fitting the front of the box having side and bottom flanges overlaying the sides and bottom of the box, and a top flange extending inwardly into the box, said top flange being cut away at its ends to provide L shaped openings, to fit the side flanges of the box, and of such dimensions that the cover can be mounted and demounted by tilting the cover in the plane of the box front to a point where the projection formed by one of the L shaped openings clears the corresponding side flange of the box front so the cover may be removed or inserted, and means to hold the cover in closed position comprising a tongue mounted on the bottom of the box spaced from the box bottom sufficiently to hold the bottom flange of the cover.

5. A weatherproof box having an open front, and otherwise closed by a bottom, back, sides and top, the top having a flange depending from it over the open front, side flanges extending from the sides of the box into the open front under the top flange, a front cover fitting the front of the box having side and bottom flanges overlaying the side and bottom of the box, and means mounted on and extending from the top of the front cover into the box which fit in back of the side flanges of the box to mount the cover both slideably for up and down motion to uncover the open front of the box, and hingedly for swinging motion, and means for holding the cover in closed position.

References Cited in the file of this patent

UNITED STATES PATENTS

| | | |
|---|---|---|
| 2,246,347 | Catherwood | June 17, 1941 |
| 2,277,618 | Utter | Mar. 24, 1942 |
| 2,656,948 | McGee | Oct. 27, 1953 |